US007006008B1

(12) United States Patent
Bervoets et al.

(10) Patent No.: US 7,006,008 B1
(45) Date of Patent: Feb. 28, 2006

(54) SYSTEM FOR DETERMINING THE POSITION OF A TRANSPONDER

(75) Inventors: Alfonsus Maria Bervoets, Bentveld (NL); Franciscus Robertus Albertus Cornelis Hin, Neerpelt (BE)

(73) Assignee: AMG-IT Holding B.V., MB Heemstede (NL)

( * ) Notice: Subject to any disclaimer, the term of this patent is extended or adjusted under 35 U.S.C. 154(b) by 346 days.

(21) Appl. No.: 10/069,372

(22) PCT Filed: Aug. 24, 2000

(86) PCT No.: PCT/NL00/00590

§ 371 (c)(1),
(2), (4) Date: Jun. 24, 2002

(87) PCT Pub. No.: WO01/14905

PCT Pub. Date: Mar. 1, 2001

(30) Foreign Application Priority Data

Aug. 25, 1999 (NL) .................................. 1012907

(51) Int. Cl.
*G08B 5/22* (2006.01)

(52) U.S. Cl. ................. 340/825.49; 340/928; 342/457; 367/125

(58) Field of Classification Search ........... 340/825.49, 340/10.1, 828, 928, 933, 825.19; 342/457, 342/928, 42, 51, 44, 373; 235/384; 367/125
See application file for complete search history.

(56) References Cited

U.S. PATENT DOCUMENTS

| | | | | |
|---|---|---|---|---|
| 4,757,315 A | | 7/1988 | Lichtenberg et al. | |
| 4,914,735 A | * | 4/1990 | Ichiyoshi | 342/125 |
| 5,227,803 A | * | 7/1993 | O'Connor et al. | 342/442 |
| 5,406,275 A | | 4/1995 | Hassett et al. | |
| 5,621,411 A | | 4/1997 | Hagl et al. | |
| 5,648,767 A | * | 7/1997 | O'Connor et al. | 340/928 |
| 5,790,052 A | | 8/1998 | Grabow | |
| 5,969,641 A | * | 10/1999 | Nakamura et al. | 340/928 |
| 6,351,215 B1 | * | 2/2002 | Rodgers et al. | 340/572.1 |

FOREIGN PATENT DOCUMENTS

| | | |
|---|---|---|
| DE | 28 43 253 A1 | 4/1980 |
| EP | 0 715 185 A2 | 11/1995 |
| EP | 0 802 515 A1 | 10/1997 |

* cited by examiner

*Primary Examiner*—Michael Horabik
*Assistant Examiner*—M Shimizu
(74) *Attorney, Agent, or Firm*—Steven M. Koehler; Westman, Champlin & Kelly, P.A.

(57) ABSTRACT

A system for determining the position of a transponder transmitting a signal and moving along a route is disclosed. The route includes a measuring station with at least two measuring points having on each side of the route and along a line generally perpendicular to the route. The measuring station includes a first receiver that receives the signal at one measuring point and a second receiver that receives the signal at the other measuring point. Each receiver provides an output. A circuit measures the phase difference between the outputs of the first and second receivers, and the transponder location along the line between the measuring points is determined based on the measured phase difference.

18 Claims, 2 Drawing Sheets

SYSTEM FOR DETERMINING THE POSITION OF A TRANSPONDER

STATE OF THE ART

Such systems are known from the state of the art. In these systems in general the object is to determine the position in the direction of movement whereby field strength measurements are used. An example thereof is described in U.S. Pat. No. 5,621,411.

In certain cases it is desirable to know the position of the transponder in a direction transverse to the course. An example thereof are the toll-installations on multi lane auto-routes. Therewith it is important to make clear in which lane a vehicle is present before the necessary data are exchanged with said vehicle in relation to the toll charging. Charging toll from a vehicle in a neighbouring lane has to be prevented.

An example of means for determining in which lane a vehicle is present in the neighbourhood of a toll charging installation is described in U.S. Pat. No. 5,406,275. In this known system one detection station per lane is used whereby care has to be taken that each detection station almost exclusively detects its own lane and causes as less as possible disturbance in the neighbouring detection stations. In this publication also the above mentioned distance measurements by means of field strength measurements are described.

This prior art system is based on clearly distinguishable lanes and has per lane separate hardware necessary to perform the required measurements.

Another example of circumstances whereby it is often desirable to know the position of the transponder in a direction transverse to the course along which the transponder is moving is formed by auto races, races with karats, skelters, bicycles of other vehicles, horseraces, houndraces and all other races which take place on a specific course. Especially at those places which are not in view of an observer it might be important to know which contestant has the innerlane, the outerlane or moves on the middle of the road, etc.

OBJECT OF THE INVENTION

The object of the invention is now to determine the position of the transponder in transversal direction in relation to a course without the necessity to divide the course in transversal direction in clearly distinghuised and electromagnetically screened lanes which each should have its own measuring station.

BRIEF DESCRIPTION OF THE INVENTION

The above mentioned object is fulfilled by a system for determining the position of a transponder, which transmits a signal and moves along a route with at least a measuring station comprising antenna means for receiving said signal at least at two measuring points positioned at the two outer points of a line segment which crosses the course in a perpendicular manner, whereby said measuring station comprises:

a first receiver for receiving said signal through said antenna means at the one measuring point and a second receiver for receiving said signal through said antenna means at the other measuring point, high frequency phase measuring means measuring the phase difference between the output signal of the first receiver and the outputsignal of the second receiver, evaluation means which, based on the measured phase difference, determines where the transponder passes said line segment.

I case the transponder is moving exactly in the middle of the road then at both measuring points signal with equal phase will be received. If the transponder is present more to the left side of the course then a predetermined phase difference will be measured. If the transponder is moving more to the right side of the course then a predetermined opposite phase difference will be measured.

Depending on the applied frequency and the width of the course it is possible that a number of phase zeros will be measured spread over the length of the line segment between both measuring points. That makes it impossible for the evaluation unit to determine the position in an unambiguous manner.

There are a number of possibilities to eliminate this unambiguity. In the first place one could think of lowering the signal frequency. However, in general the applied frequencies are bounded to various national and international agreements which in general prevent a variation of the signal frequency. However, applying a modulation is possible whereby a relatively low modulation frequency can be selected. In that case not the signal itself but the modulation frequency is used for the phase measuring.

A system which is embodied according to this principle has the characteristic that the transponder transmits a modulated signal, that the first receiver is followed by a first demodulator for demodulating the received signal, that the second receiver is followed by a second demodulator for demodulating the received signal, and that low frequency phase measuring means measure the phase difference between the output signal of the first demodulator and the output signal of the second demodulator. In this system not the phase of the carrier wave but the phase of the modulating signal is measured of which the frequency is much lower and by means of which a line segment with a larger length (and therefore a course with a larger width) can be covered unambiguously without a number of zero phase measuring points.

A disadvantage of the above mentioned system may be that the accuracy of the location determination based on relatively low frequency modulation signal is lower than in case the higher frequency signals would be used. To solve said problem, it is preferred to combine both embodiments such that the evaluation means use the output signal of the low frequency phase measuring means for "coarse" position determination whereas the output signal of the high frequency phase measuring means is used for "fine" position determining.

In principle various types of modulation can be used, amplitude modulation, frequency modulation, phase modulation, etc. A type of modulation which needs only very simple circuits to obtain a properly functioning system is amplitude modulation whereby the modulation signal is a pulse series by means of which the amplitude of the carrier wave is modulated between 0% and 100%. In other words the transponder transmits signal trains.

Another possibility to remove the uncertainty as resulting from various zero crossings is reducing the line segment and apply a serious circuit of a number of smaller line segments. The length of each smaller line segment has to be such that within each line segment an unambiguous measurement can be performed. To be able to determine which line segment will supply the correct measuring value use can be made of a field strength measurement in each of the measuring points. The line segment which is bounded by those measuring points which together have the strongest sum signal is selected.

A system functioning according to this principle has the characteristic that between both ends of said line segment another N measuring points are realised such that the line segment is divided by N+2 measuring points into N+1 segments each having a length which is small enough to realise an unambiguous measurement within said segment, whereby the N+2 measuring points are connected to N+2 receivers, the output of each of said receivers is connected to a field strength measuring means, the output signals of all field strength measuring means are evaluated in a comparison circuit, which comparison circuit transfers the output signals of those two receivers having together the largest field strength, to a phase comparator to be mutually compared whereafter the resulting output signal of the phase comparator controls an evaluation unit.

Instead of field strength measurements a combination of carrier measurements and modulation signal measurements is conceivable. In that case the system comprises an first elongated loop antenna which is used for p-hase measurements of the modulation signals at the end points in the above described manner. The result thereof is a position with a relative low accuracy. The system comprises in that case a second antenna having a series circuit of small loop antennas which are used each for a phase measurement based on the carrier signal at the ends of each small loop antenna. The position with low accuracy is used to select one of the small loup antennas. The phase measurement on this selected small loop antenna results into a position with a relatively high accuracy. A disadvantage of this embodiment is the rather complicated antenna system, necessary for performing the measurements.

A further preferred embodiment of the system has according to the invention the characteristic that the measurement is repeated a number of times in a row, whereafter the results are interpolated such that from the results the track can be derived which was followed by the transponder within said course.

INDICATION OF THE FIGURES

The invention will be explained in more detail hereinafter with reference to the attached drawings.

FIGURE DESCRIPTION

Figure 1:
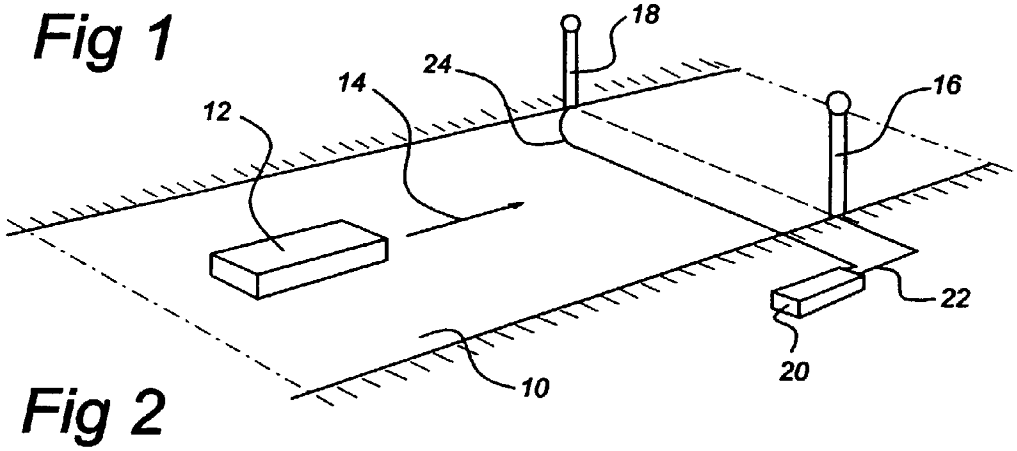
FIG. 1 illustrates schematically a perspective view on a part of a course, hereby at both sides of the course a receiving antenna of a measuring station is installed.

FIG. 1 illustrates schematically a part of a course 10, e.g. part of a road, along which a transponder 12 is moving in the direction of the arrow 14. The transponder 12 will in a practical case be attached in or on an automobile, a motorbike or another vehicle, or to a human or animal, and will thereby be moved along the course 10 in the indicated direction.

At a number of places along the course measuring means are installed by means of which the position of the transponder 12 in transversal direction can be determined. In FIG. 1 such a measuring post is illustrated comprising an antenna 16 at one side of the road and an antenna 18 at the other side of the road, an electronics unit 20 which through a line 22 is connected to the antenna 16 and through a line 24 is connected to the antenna 18.

During operation the transponder 12 will transmit with short intermediate distances a signal which could be a continuous sinewave with predetermined frequency but could also be a modulated carrier wave. Preferably in the last mentioned case the carrier wave is modulated by a pulse series of significant lower frequency so that "signal trains" are formed.

For the coming part of this description it is assumed that the transponder transmits a continuous and preferably sinusoidal signal. This transmitted signal is received by both antennas 16 and 18. The received signals are transferred through lines 22 and 24 to the electronics units 20 in which the signals are phase compared with each other. If it is assumed furthermore that the signal lines 22 and 24 have the same length then it will be clear that, in case the transponder 12 is on the middle of the road, and the distance between the transponder 12 and the antenna 16 is identical to the distance between the transponder 12 and the antenna 18, both received signals in the electronics circuit 20 have the same phase. A phase difference 0 indicates therefore that the transponder 12 is in the middle of the road (or at least can be there). In case the transponder 12 is deviating from the middle of the road to the left then between both received signals a certain phase difference will be developed. If the transponder 12 deviates from the middle of the road into the right direction then in both received signals an opposite phase difference will be developed. If both lines 22 and 24 are not exactly of the same length then this will cause a fixed phase difference for which compensation can be provided as will be clear for the expert in this field. A similar note can be made by other embodiments of the system which will be described hereinafter.

A disadvantage of the schematically illustrated system in FIG. 1 is that this system can be realised in practice only for rather high carrier frequencies. Only then the dimensions of the antennas 16 and 18 will be such they are allowable in practice. Many of the momentarily used transponder applications, for instance for tracking vehicles along certain road sections, make use of much lower carrier frequencies. In that case it is preferred to use another antenna configuration as schematically illustrated in FIG. 2.

Figure 2:
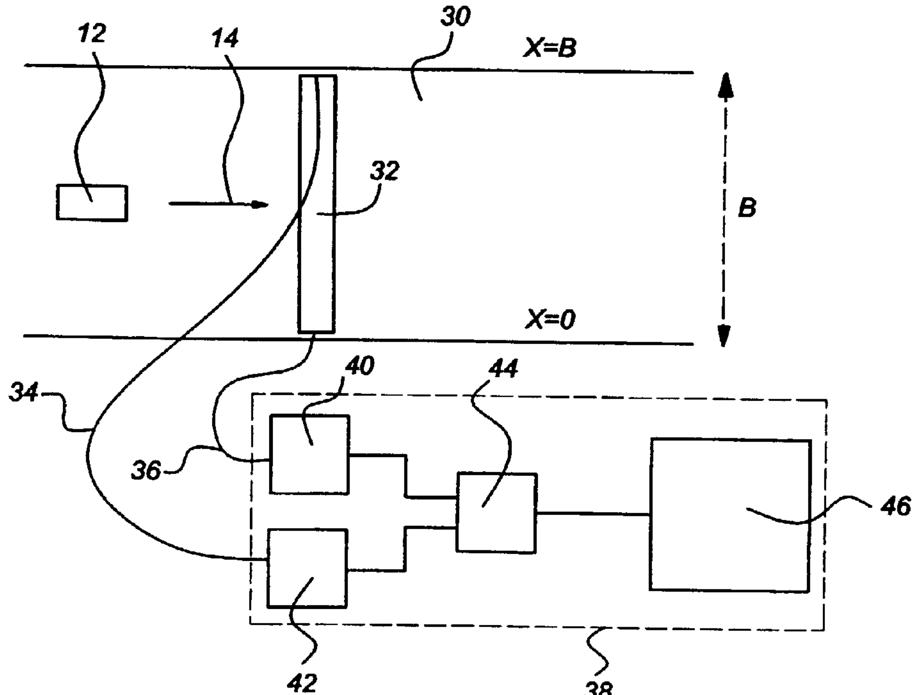
FIG. 2 illustrates a top view on a measuring station with a loop shaped antenna on or in the surface of the course.

In FIG. 2 the course in top view is indicated in general by 30. In an imaginary coordinate system the direction of movement 14 of the transponder 12 equals the Y-direction. Transversal to this direction, in other words in the width direction of the course 30 the X-direction is assumed whereby in the example of FIG. 2 the lower side of the course overlaps X=0 whereas the upper side edge of the course overlaps X=B, whereby B is the width of the course 30. On the traject a loop shaped antenna 32 is installed comprising two long parallel conductors extending at short distance of each other which at X=0 and X=B are connected by short transversal conductors. The short transversal conductors are through the conduits 34 and 36 in connection with the electronic unit 38. In this electronic unit 38 two receivers 40 and 42 are positioned as well as a phase measuring unit 44 and an evaluation unit 46.

The signals measured at the ends of the loop antenna 32 are through lines 34 and 36 supplied to the receivers 40 and 42 and there amplified up to a desired level. The output signals of the receivers 40 and 42 are in a phase measuring unit 44 compared in phase with each other resulting into a phase output signal. This phase output signal is supplied to an evaluation unit 46 which derives an X-value from this phase signal. If the transponder is located exactly in the middle of the road then the unit 46 will provide a value X=B if the transponder is located more to the lower side of the road then the unit 46 will for instance provide the signal X=X1, whereby X1<½B, whereas if the transponder 12 is more located to the upperside the unit 46 can supply for instance a signal X=X2 whereby X2>½B is.

Figure 3:
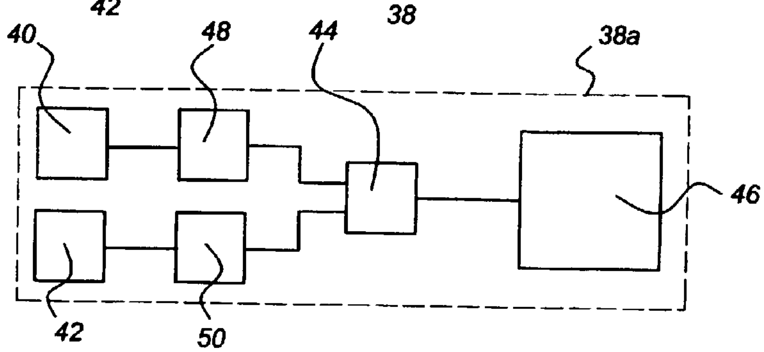
FIG. 3 illustrates another embodiment of the electronics in the measuring station.

Dependent on the selected carrier wave frequency and dependent on the width B of the course it will happen that a number of 0 points are developing on the loup shaped antenna 32 so that the measurement is not unambiguous anymore. To provide a remedy it is for instance possible to make use of a modulated carrier wave instead of a continuous carrier wave whereby for the phase measurement not the carrier wave but the modulation signal with a much lower frequency is used. The electronics unit 38*a* is in that case extended by 2 demodulators in the way, as schematically is illustrated in FIG. 3. A first demodulator 48 is installed between the receiver 40 and the phase measuring unit 44 whereas a second demodulator 50 can be placed between the receiver 42 and the phase measuring unit 44. By adding these both demodulators 48 and 50 in the phase measuring unit 54 the phase difference between the modulation signals is measured. Because thereby signals with a very low frequency are involved it is now possible by a suitable selection of the frequency to reduce the number of zero points in the output signal of the unit 44 to only one. The evaluation unit 46 is able therewith to indicate unambiguously within the course X=0 and X=B where the transponder 12 is located.

Figure 4:
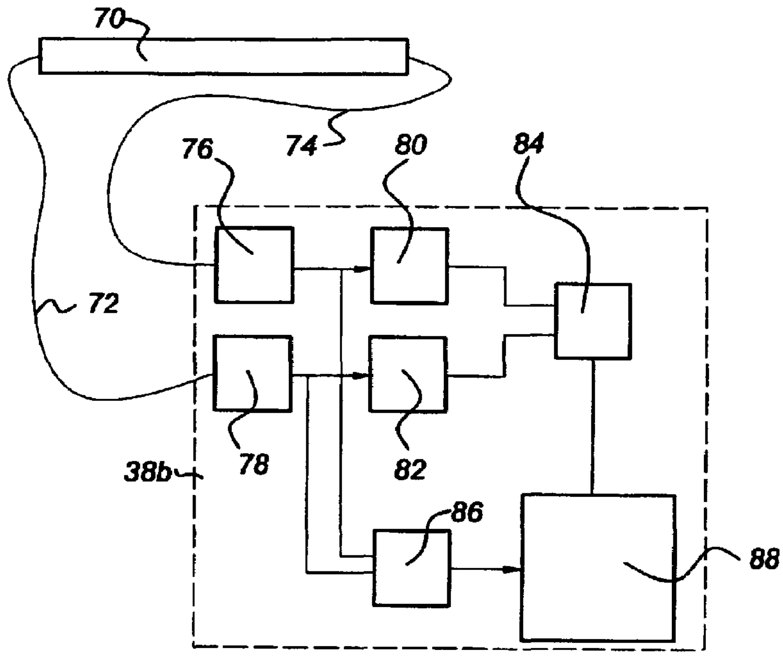
FIG. 4 illustrates an embodiment whereby the modulation signal is used for "course" position determination and the high frequency carrier signal is used for "fine" position determination.

A disadvantage of the use of relatively low frequency modulation signals can be that the therewith-obtained accuracy in the position determination is lower than in case the higher frequency carrier wave is applied. In the embodiment which is schematically illustrated in FIG. 4 the advantages of both embodiments are combined. The elongated loop antenna which is present in or on the course is in that case indicated by 70. The ends of the antenna 70 are through lines 72 and 74 connected with the respective receiver 76 and 78. Each of the receivers supplies a high frequency modulated signal to one of the respective demodulators 80 and 82. The lower frequent modulation signals at the outputs of the demodulators 80 and 82 are supplied to the inputs of the phase comparator 84.

The high frequency output signals of the receivers can be compared directly with each other in the phase comparator 86. As indicated above this may lead to a non-unambiguous location determination. By combining the output signal of the phase comparator 84, by means of which the position is "coarse" indicated however not unambiguously, with the output signal of the phase comparator 86 it will be clear that within the "coarse" determination a "fine" tuning can be applied. The evaluation unit 88 therefore provides as a result a location determination with high accuracy.

Above one has assumed that the usual antenna is present in or on the surface of the road. That is however not necessary. The transponder can be embodied also as a vertical standing loop or window antenna. Also an antenna at a certain height above the road such, that the transponder can move underneath the antenna, can be applied.

Figure 5:
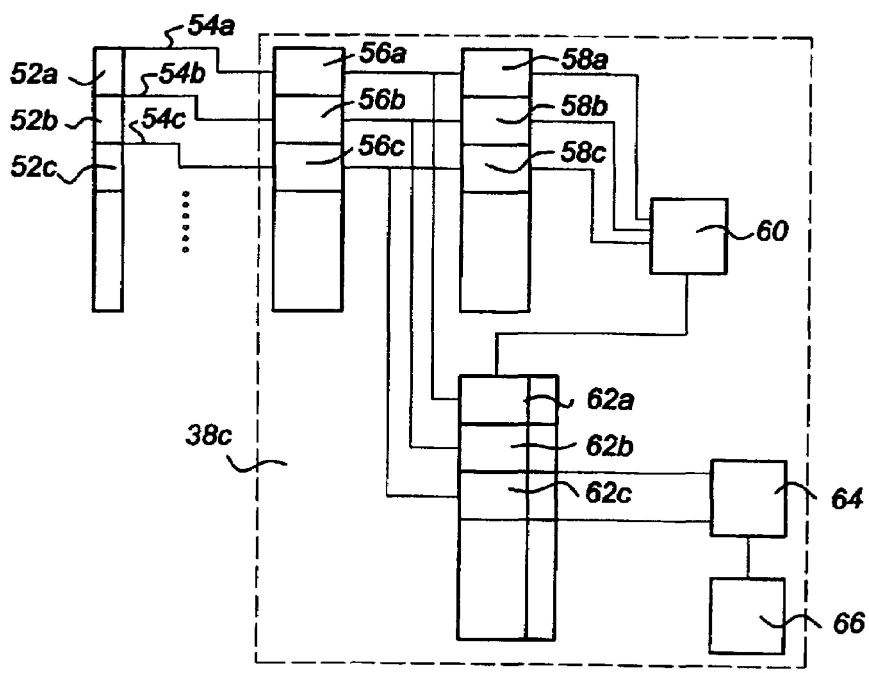
FIG. 5 illustrates schematically an embodiment in which use is made of an antenna consisting of the series circuit of a number of loops.
Figure 6:
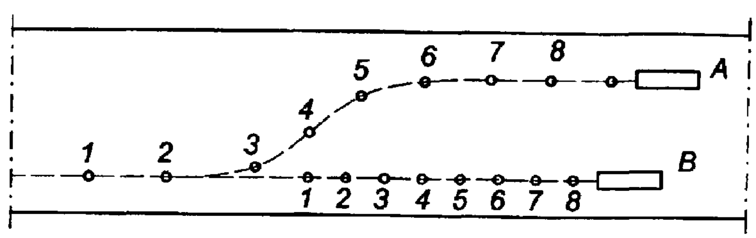
FIG. 6 illustrates schematically the exact route of a vehicle as function of a number of measurements performed by the system.

Another possibility to eliminate the ambiguity in the outputsignal of the phase measuring unit 44 is illustrated in FIG. 5. Instead of an elongated loop shaped antenna 32 such as in FIG. 2 or FIG. 4 in this case use is made of a series circuit of a number of much shorter loop antennas 52*a*, 52*b*, 52*c*, . . . . Each of these antennas is through an own line 54*a*, 54*b*, 54*c* . . . connected to an own receiver 56*a*, 56*b*, 56*c*, . . . in the electronic unit 38*c*. The outputs of the various receivers are connected to a series of field strength meters 58*a*, 58*b*, 58*c*, . . . which supply output signals to a comparison circuit 60. All these output signals together form a curve which indicates where, above which small antenna 52*a*, 52*b*, 52*c*, . . . the transponder has to be found. The comparison circuit 60 in fact establishes which two adjacent receivers have the largest summing amplitude of the received signals and controls the series of switches of 62*a*, 62*b*, 62*c*, . . . such that only the output signals of these two selected receivers are transferred to the phase measuring circuit 64. The outputsignal of the phase measurement circuit 64 is taken into account by the evaluation circuit 66 together with the positions of the switches 62*a*, 62*b*, 62*c*, . . . .

Above it is assumed that the transponder is an active transponder which transmits signal trains with regular intervals without being activated thereto by an externally received signal. The invention however can be applied wit good results in combination with passive transponders which become only active after reception of an activated signal and will transmit then a response signal.

Finally it is remarked that in the above description a line segment is assumed which is perpendicular to the track direction and which has its endpoints at the edges of the track. A line segment which is not ideally perpendicular but makes a small angle with the direction of the track such as caused by not accurately setting of the line segment can appear easily in practice and will in general not lead to a grave measuring error. Only if the angle is relatively large (larger than 10 degrees) then this angle should be taken into account in the evaluating means.

What is claimed is:

1. System for determining a position of a transponder, which transmits a signal and moves along a route with at least a measuring station comprising antenna means for receiving said signal at least at two measuring points positioned at the two outer points of a line segment which crosses the course in a perpendicular manner, wherein said measuring station comprises:

- a first receiver for receiving said signal through said antenna means at the one measuring point,
- a second receiver for receiving said signal through said antenna means at the other measuring point,
- high frequency phase measuring means measuring the phase difference between the output signal of the first receiver and the output signal of the second receiver,
- evaluation means which, based on the measured phase difference, determines where the transponder passes said line segment.

2. System according to claim 1, wherein the system comprises an elongated loop antenna comprising two parallel antenna conductors extending a short mutual distance and having a length equal to the length of said segment, which antenna conductors are connected at their ends where the measuring points are formed.

3. System according to claim 1, wherein the system is adapted such that the measurement is repeated a number of times in a row, whereafter the results are interpolated such that from the results the track can be derived which was followed by the transponder within said coarse course.

4. System according to claim 1, wherein the transponder transmits a modulated signal, that the first receiver is followed by a first demodulator for demodulating the received signal, that the second receiver is followed by a second demodulator for demodulating the received signal, and wherein the system further comprises a second phase measuring unit adapted to operate at a frequency lower than the first-mentioned phase measuring means to measure the phase difference between the output signal of the first demodulator and the output signal of the second demodulator.

5. System according to claim 4, wherein the evaluation means use the output signal of the low frequency phase measuring means for coarse position determination whereas the output signal of the high frequency phase measuring means is used for fine position determination.

6. System according to claim 4, wherein the modulated signal is obtained by amplitude modulation whereby the modulation signal is a pulse series by means of which the amplitude of the carrier wave is modulated between 0% and 100%.

7. System according to claim 1, wherein that between both ends of said line segment another N measuring points are realized such that the line segment is divided by N+2 measuring points into N+1 segments each having a length which is small enough to realize an unambiguous measurement within said segment, whereby the N+2 measuring points are connected to N+2 receivers, the output of each of said receivers is connected to a field strength measuring means, the output signals of all field strength measuring means are evaluated in a comparison circuit, which comparison circuit transfers the output signals of those two receivers having together the largest field strength, to a phase comparator to be mutually compared whereafter the resulting output signal of the phase comparator controls an evaluation unit.

8. System according to claim 7, wherein the antenna is built as a series circuit of N+1 small loop antennas each comprising two parallel antenna conductors extending at short mutual distance of which the ends are interconnected, which loop antennas are in length direction coupled to each other.

9. A system for determining a position of a transponder, which transmits a signal and moves along a route, the system comprising:

- an antenna assembly having a first point of measurement and a second point of measurement, the points of measurement configured to define a line segment which crosses the course in a perpendicular manner, the antenna assembly adapted to receive said signal at each point of measurement;
- a first receiver coupled to the antenna assembly and adapted to provide a first output signal based on said signal as received at the first point of measurement;
- a second receiver coupled to the antenna assembly and adapted to provide a second output signal based on said signal as received at the second point of measurement;
- a phase measuring unit coupled to the first receiver and the second receiver, the phase measuring unit adapted to provide a phase output signal based on a phase difference between the first output signal of the first receiver and the second output signal of the second receiver; and
- an evaluation unit coupled to the phase measuring unit and adapted to determine a position of the transponder along the line segment based on the phase output signal.

10. The system according to claim 9, wherein the antenna assembly has N points of measurement between both ends of said line segment such that the line segment is divided by N+2 points of measurement into N+1 segments each having a length which is small enough to realize an unambiguous measurement within said segment, and wherein the system further comprises:

- N+2 receivers in total, wherein a receiver is coupled to a point of measurement and adapted to provide a corresponding output signal based on said signal as received at each point of measurement;
- a field strength measuring assembly adapted to receive each of the output signals and provide a corresponding output signal of field strength; and
- a comparison circuit adapted to receive the output signals of field strength and adapted to determine the output signals of those two receivers having together the largest field strength and adapted to provide said output signals to the phase measuring unit.

11. The system according to claim 9, wherein the antenna assembly comprises an elongated loop antenna comprising two parallel antenna conductors extending a short mutual distance and having a length equal to the length of said segment, which antenna conductors are connected at their ends where the first and second points of measurement are formed.

12. The system according to claim 9, wherein the transponder is adapted to transmit a modulated signal by amplitude modulation whereby the modulated signal is a pulse series where the amplitude of the carrier wave is modulated between 0% and 100%, and wherein the system further comprises:

- a first demodulator coupled to the first receiver and adapted to demodulate the first output signal;
- a second demodulator coupled to the second receiver and adapted to demodulate the second output signal; and
- a second frequency phase measuring unit coupled to the first and second demodulators and adapted to measure a phase difference between an output signal of the first demodulator and an output signal of the second demodulator and adapted to operate at a frequency lower than the first-mentioned phase measuring unit.

13. The system according to claim 12, wherein the evaluation unit is adapted to use the output signal of the second phase measuring unit to determine a coarse position and wherein the evaluation unit is adapted to use the output signal of the first-mentioned phase measuring unit to determine a fine position.

14. A method for determining a position of a transponder, which transmits a signal and moves along a route, the method comprising:

- providing a first signal based on said signal as received at a first point of measurement;
- providing a second signal based on said signal as received at a second point of measurement, the second point of measurement being positioned relative to the first point of measurement to define a line segment which crosses the course in a perpendicular manner;

measuring a phase difference between the first signal and the second signal; and determining a position of the transponder along the line segment based on the measured phase difference of the first and second signals.

15. The method according to claim 14 and further comprising:

providing an antenna assembly having N points of measurement between both ends of said line segment such that the line segment is divided by N+2 points of measurement into N+1 segments each having a length which is small enough to realize an unambiguous measurement within said segment;

wherein providing the first signal based on said signal as received at the first point of measurement and providing the second signal based on said signal as received at the second point of measurement comprises providing N+2 signals in total based on said signal as received at each of the N+2 points of measurement;

measuring a field strength at each of the N+2 points of measurement; and determining those two signals having together the largest field strength; and wherein determining the position of the transponder along the line segment comprises using those two signals having together the largest field strength.

16. The method according to claim 14 and further comprising providing an antenna assembly including an elongated loop antenna having two parallel antenna conductors extending a short mutual distance and having a length equal to the length of said segment, which antenna conductors are connected at their ends where the first and second points of measurement are formed.

17. The method according to claim 14, wherein the transponder is adapted to transmit a modulated signal by amplitude modulation whereby the modulated signal is a pulse series where the amplitude of the carrier wave is modulated between 0% and 100%, and wherein the method further comprises:

demodulating the first signal;

demodulating the second signal; and measuring a phase difference between the demodulated first signal and the demodulated second signal.

18. The method according to claim 17, wherein determining a position comprises:

determining a coarse position based on the phase difference between the demodulated first signal and the demodulated second signal; and determining a fine position based on the phase difference between the first signal and the second signal.

* * * * *

UNITED STATES PATENT AND TRADEMARK OFFICE

CERTIFICATE OF CORRECTION

PATENT NO. : 7,006,008 B1
APPLICATION NO. : 10/069372
DATED : February 28, 2006
INVENTOR(S) : Bervoets et al.

It is certified that error appears in the above-identified patent and that said Letters Patent is hereby corrected as shown below:

Title page, item 73, replace “AMG-IT Holding B.V., MB Heemstede (NL)” with -- AMB-IT Holding B.V., MB Heemstede (NL)--.

Column 7, line 9
Line 9, delete “coarse”.

Column 8, line 55
Line 55, delete “coarse” and insert --course--.

Column 10, line 25
Line 25, delete “coarse” and insert --course--.

Signed and Sealed this
Fourteenth Day of June, 2011

David J. Kappos
*Director of the United States Patent and Trademark Office*